United States Patent [19]
Dennett

[11] Patent Number: 5,696,434
[45] Date of Patent: Dec. 9, 1997

[54] SWITCH AND METHOD FOR JUMP-STARTING A 24 VOLT VEHICLE WITH A 12 VOLT VEHICLE

[76] Inventor: Gene Dennett, 430 Akron, Augusta, Kans. 67010

[21] Appl. No.: 677,023

[22] Filed: Jul. 8, 1996

[51] Int. Cl.⁶ .................. H01M 10/44; H02J 7/00
[52] U.S. Cl. ............................ 320/16; 320/7
[58] Field of Search ................ 320/6, 7, 15, 16, 320/17, 18

[56] References Cited

U.S. PATENT DOCUMENTS

| | | | |
|---|---|---|---|
| 1,559,385 | 10/1925 | Turbayne | 320/6 |
| 2,096,378 | 10/1937 | Mitchell | 320/7 X |
| 3,343,057 | 9/1967 | Smith | 320/6 |
| 4,100,474 | 7/1978 | Pfeffer et al. | 320/17 |
| 4,233,552 | 11/1980 | Baumbach | 320/7 |
| 4,963,813 | 10/1990 | Bolle | 320/17 |
| 4,999,562 | 3/1991 | Hill | 320/7 |
| 5,027,050 | 6/1991 | Slough | 320/15 X |

*Primary Examiner*—Peter S. Wong
*Assistant Examiner*—Patrick B. Law
*Attorney, Agent, or Firm*—Shook, Hardy & Bacon L.L.P.

[57] ABSTRACT

A switching apparatus and method for alternatively connecting at least two 12 volt automobile batteries, or other suitable D.C. power source, either in series or in parallel to provide D.C. current to a vehicle having a 12 volt or 24 volt electrical system which requires jump starting. The switching apparatus consists of five terminal members which are alternatively connected together with a pair of connecting members in such a way to correspondingly effect series connection of the batteries or parallel connection of the batteries.

14 Claims, 7 Drawing Sheets

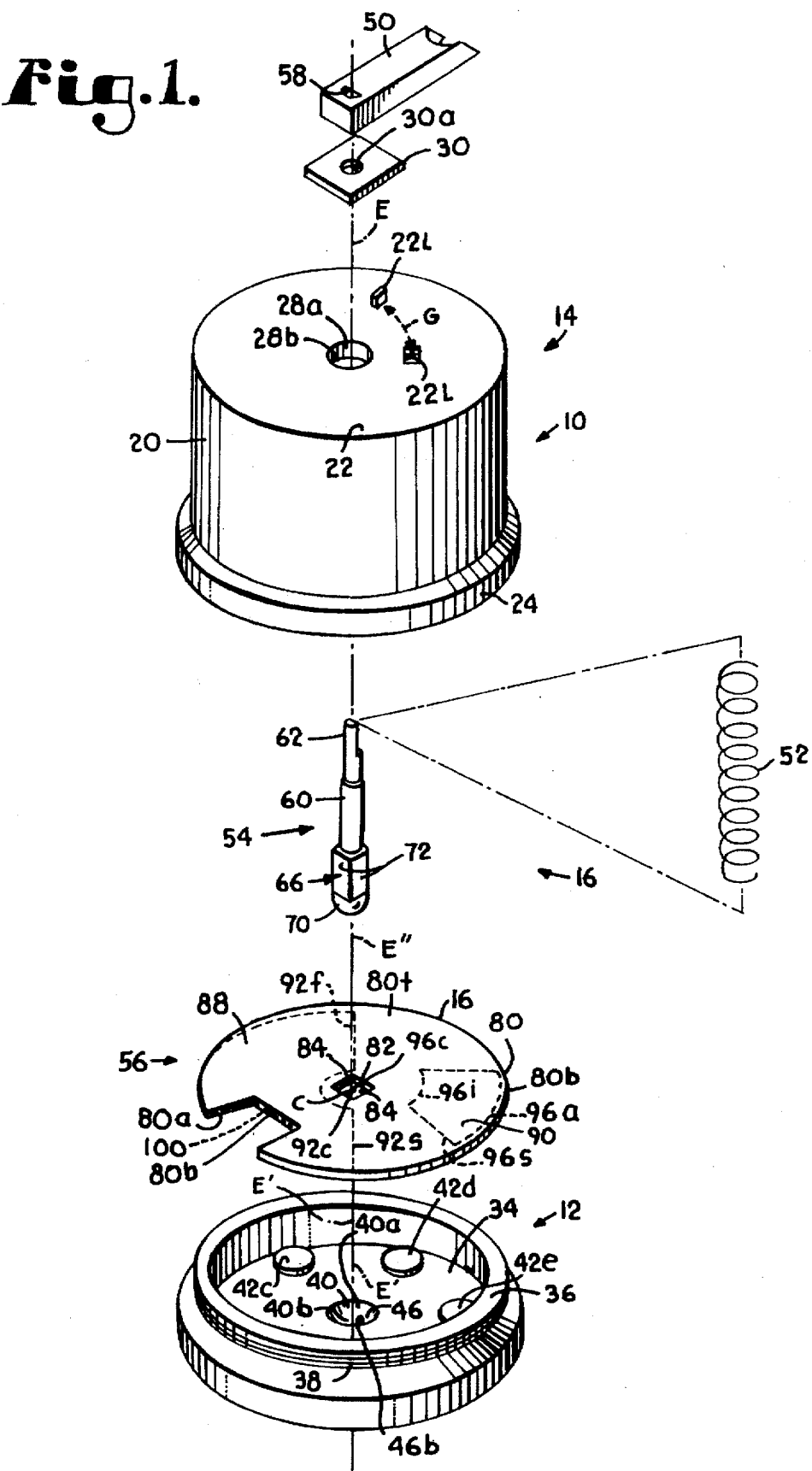

SWITCH AND METHOD FOR JUMP-STARTING A 24 VOLT VEHICLE WITH A 12 VOLT VEHICLE

FIELD OF THE INVENTION

The present invention is generally related to vehicular starting systems utilizing at least two batteries. More specifically, the present invention is related to an apparatus and method for rapidly switching a multi-battery network between a pair of voltage settings for the purpose of providing starter current from a starter system using one such voltage to another starter system utilizing another voltage.

BACKGROUND OF THE INVENTION

A patentability investigation was conducted and the following U.S. Patents by numbers were found: U.S. Pat. No. 1,559,385 to Turbayne; U.S. Pat. No. 3,343,057 to Smith; U.S. Pat. No. 4,100,474 to Pfeffer; U.S. Pat. No. 4,233,552 Baumbach; and U.S. Pat. No. 4,963,813 to Bolle.

The U.S. Pat. No. 1,559,385 to Turbayne teaches a double voltage system in which the transition from generator to battery may be accomplished with a minimum of fluctuation across the translation circuit. The U.S. Pat. No. 4,100,474 to Smith teaches an apparatus or system to protect the polarity of a battery by means of an audible signal. The U.S. Pat. No. 3,343,057 to Pfeffer et al teaches a multi-voltage vehicular network system to provide a higher voltage for starting of the vehicle and a normal on-board voltage for operation of vehicle devices (e.g., fans, motors, lamps, buzzers, and the like). The U.S. Pat. No. 4,233,552 to Baumbach teaches a vehicle-starting circuit employing two starting batteries, particularly to an improvement in the starting circuit for detection of excessive voltage. The U.S. Pat. No. 4,963,813 to Bolle teaches a control for an electrical charging system for selectively connecting a single alternator with two starter coil sets producing charging current at each of six outputs to the output of a first battery and the output of a second battery, serially connected to the first battery output.

None of the foregoing prior art U.S. Patents teach or suggest the particular method and/or apparatus of the present invention.

SUMMARY OF THE INVENTION

The present invention accomplishes its desired objects by providing a switching apparatus for alternatively combining a first D.C. voltage supply with a second D.C. voltage supply in series or parallel wherein the second D.C. voltage supply voltage is generally equivalent to the value of the first D.C. voltage supply's voltage. The switching apparatus comprises including housing assembly comprising a body member defined by a generally circular wall member having a top member perimetrically secured to a top edge thereof and a base member threadably secured to a bottom edge of the base member. The top member comprises a shaft aperture which is generally coaxially aligned with the circular wall member while the base member has a bottom with a generally dome-shaped recess disposed in the bottom so as to be coaxially and concentrically aligned with the circular wall member and the shaft aperture. The shaft aperture and the dome shaped recess support a generally cylindrical shaft member disposed coaxially therewith. A plurality of terminal members is disposed in the bottom of the base so as to be generally equally, radially spaced from the generally dome-shaped recess. The plurality of terminals comprises a first terminal, a second terminal, a third terminal, a fourth terminal, and a fifth terminal. The first, second, third, and forth terminals are generally equispaced such that an arcuate measure of between 85 and 95 degrees exists between each of the first, second, third, and forth terminals. The fifth terminal is equispaced between the first and forth terminals so as to comprise an arcuate measure of between 40 and 50 degrees between the first terminal and the fifth terminal. A switching assembly is supported by the housing and comprises the generally cylindrical shaft member defined by a top shaft end, a bottom shaft end, and a keyed shaft section. The shaft top end comprises a general D-shape in horizontal cross section and the bottom shaft end comprises a convex dome shape for complementing the generally dome shaped recess of the base member. The keyed shaft section of the generally cylindrically shaped shaft defines at least one flat, keyed surface for engaging an electrically non-conductive supporting disc. The non-conductive supporting disc member has a support top face, a support bottom face, and a coaxially disposed keyed aperture which defines a shape which is complementary to the keyed shaft section of the generally cylindrical shaft member for being fixedly coupled to the keyed shaft section of the generally cylindrically shaped shaft member so as to be coaxially aligned therewith. The supporting disc comprises a primary connection plate member secured to the support bottom of the non-conductive supporting disc member for electrically connecting at least two of the plurality of terminals and a secondary connection plate member secured to the support bottom of the non-conductive supporting disc member for electrically connecting with at least one of the plurality of terminals. A handle member for rotatably moving the generally cylindrical shaft member and the non-conductive supporting disc member coupled therewith is coupled to the shaft member with a generally D-shaped aperture for complementarily engaging the D-shaped shaft top end.

It is another object of the present invention to provide a method for alternatively connecting at least two batteries in series or in parallel comprising:

(a) providing a first battery member having a first voltage;

(b) providing a second battery member having a second voltage;

(c) providing a switching apparatus for connecting the first battery with the second battery having a housing having five terminal members disposed therein and for rotatably supporting a switching assembly comprising a supporting disc having a primary connection plate adapted for alternatively interconnecting at least two of the five terminals and a secondary connection plate for alternatively interconnecting at least one of the terminals;

(d) connecting a first positive terminal of the first battery to a second terminal of the five terminals;

(e) connecting a second positive terminal of the second battery to a third terminal of the five terminals;

(f) connecting a first negative terminal of the first battery to a forth terminal of the five terminals;

(g) connecting a second negative terminal of the second battery to a fifth terminal of the five terminals;

(h) rotating the supporting disc so as to interconnect the second terminal and the third terminal with the primary connection plate to interconnect the first positive terminal with the second positive terminal;

(i) simultaneously interconnecting the forth terminal and the fifth terminal with the secondary connection plate to interconnect the first negative terminal with the second negative terminal to connect the first battery with the second battery in parallel;

(j) commencing reverse rotation the supporting disc so at to disconnect the third terminal from the primary connection plate;

(k) simultaneously with the commencing step (j) disconnecting the secondary connection plate from the fifth terminal; and (l) further rotating the supporting disc so as to interconnect the fifth terminal and the second terminal with the primary connection plate to connect the first positive terminal with the second negative terminal to connect the first battery with the second battery in series.

These, together with the various ancillary objects and features which will become apparent to those skilled in the art as the following description proceeds, are attained by this novel method and apparatus, preferred embodiments as shown with reference to the accompanying drawings, by way of example only, wherein:

BRIEF DESCRIPTION OF THE DRAWINGS

FIG. 1 is a segmented perspective view of a voltage switching apparatus of the present invention disclosing a lever member, a body member, and a pair of terminal members;

DETAILED DESCRIPTION OF THE INVENTION

Figure 1A:
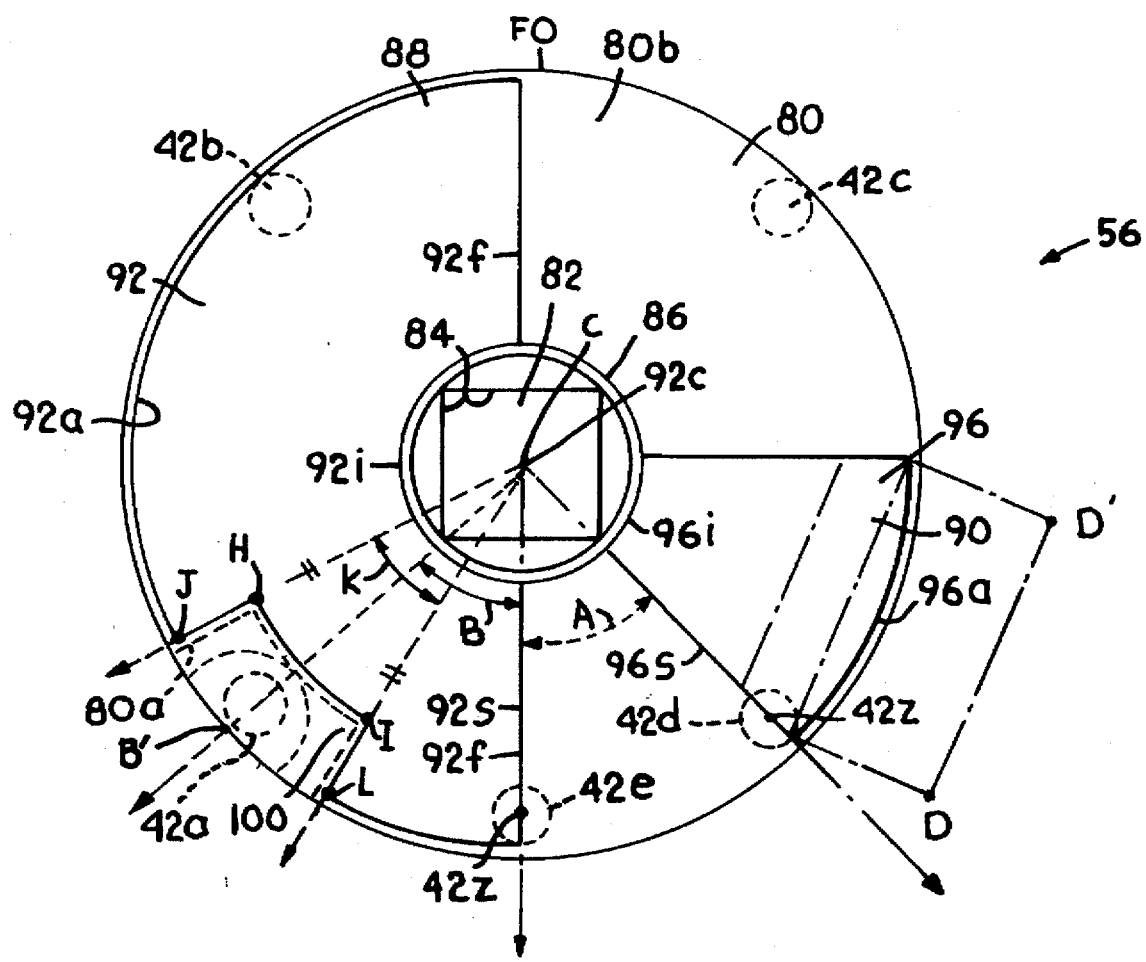
FIG. 1A is a top plan view of a switching disc assembly of the present invention.

Turning now to the drawings wherein like parts of the invention are identified by similar reference numerals, there is seen in FIG. 1 a preferred embodiment of the voltage switching apparatus of the present invention, generally indicated as 10. The switching apparatus 10 generally comprises a body assembly 14 demountably secured to a base assembly 12 having a plurality of terminal members 18—18 situated in the base assembly 12. The base assembly 12 is adapted for rotatably supporting a switching assembly, generally illustrated as 16, which is rotatably supported at opposed ends thereof by the base assembly 12 and the body assembly 14. As will be further understood as this description proceeds, the switching assembly 16 comprises a switching shaft assembly 54 for supporting a switching disc assembly, generally illustrated as 56, which is adapted to selectively electrically contacting and interconnecting two or more of the terminal members 42.

Figure 2:
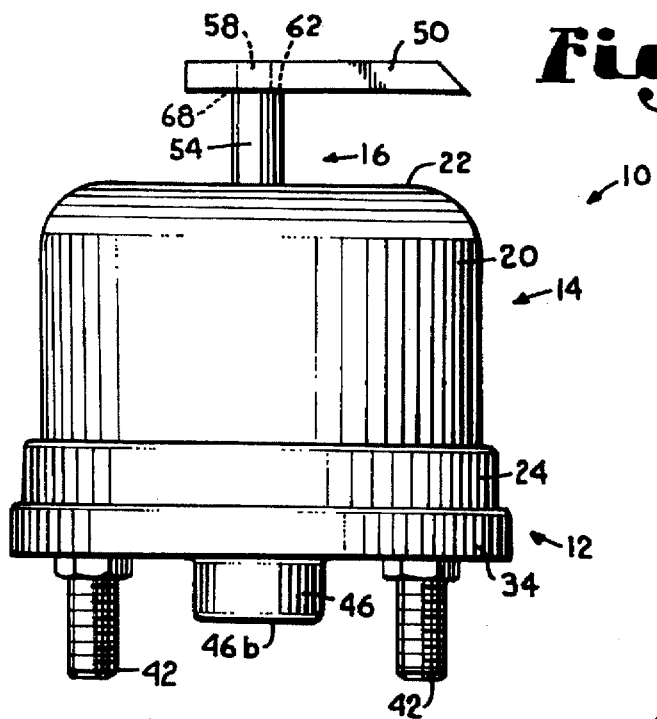
FIG. 2 is a side elevational plan view of a housing body of the voltage switching apparatus of FIG. 1.
Figure 3:
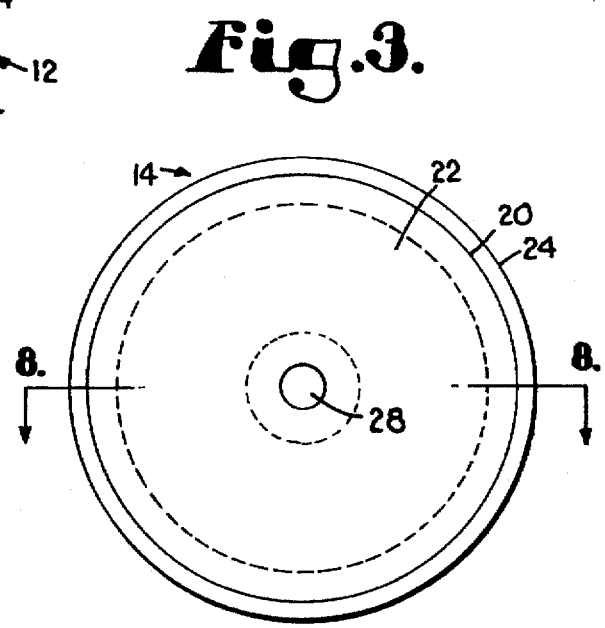
FIG. 3 is a top plan view of the voltage switching apparatus of FIG. 2.
Figure 8:
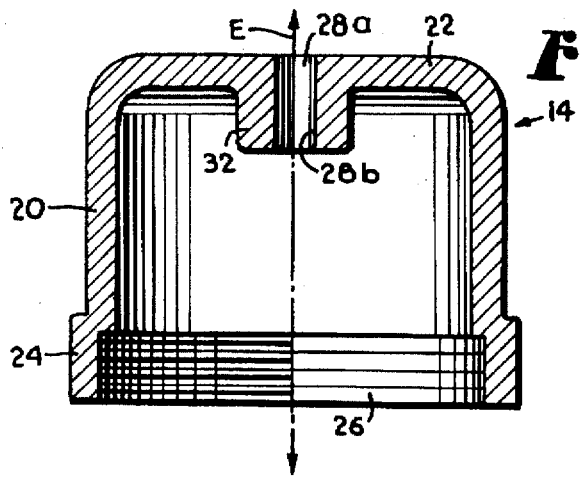
FIG. 8 is a vertical sectional view taken in direction of the arrows and along the plane of line 8—8 in FIG. 3.

The body member 12, in one preferred embodiment as best shown in FIGS. 2 and 3, comprises a generally hollow, cylindrically shaped, arcuate, or annular wall member 20 having a generally flat, circular top 22 perimetrically secured thereto, such that the body member 12 may be generally defined as being cup-shaped, which may be formed of any suitable, non-conductive and/or insulating material. A preferred material for the body assembly 12 is available on the commercial market under the trade name Bakelite® by the Union Carbide Corporation. A perimetrical bottom base lip or ridge 24 is integrally bound or formed of the cylindrical wall 20 (i.e., opposite top 22). The base lip 24 comprises inner body threads 26, as shown in FIG. 8, for engaging complementary threads (to be identified as 38 below) of the base assembly 12. Of course, it is appreciated that any suitable means for securing the base assembly 12 to the body assembly 14 may be employed.

The body assembly 12 further comprises a stress relief or shaft support structure 32 secured to the top 22 for providing support to the switching assembly 16, as will be further discussed below. The shaft support structure 32 comprises a bore or aperture 28B for slidably receiving a shaft 60 of the switching assembly 16, which bore or aperture 28B is concentrically and/or coaxially aligned with an aperture 28A disposed in the top 22 wherethrough a portion of the shaft 60 may slidably pass to be supported therein. As shown in FIG. 8, the body assembly 14 comprises axis E whereupon the axes of the apertures 28A and 28B are coaxially aligned. As further best shown in FIG. 8, the aperture 28A and the aperture or bore 28B are generally equivalent in diameter, and serve to rotatably support the shaft 60 when disposed in the body assembly 12 (see FIG. 1). Thus, alternatively put forth, the stress relief or support structure 32 comprises a structure defining an annulus having the bore 28B thereof which is concentrically and/or coaxially aligned with the aperture 28A in top 22.

In order to lend additional support to the shaft 60 of the switching assembly 16, a retaining support plate member 30 having an aperture 30A thereof coaxially and/or concentrically aligned with the apertures 28A and 28B of the respective top 22 and shaft support structure 32 may be secured to the top 22, as shown in FIG. 1, to prevent undue wearing of the aperture 28A.

Figure 9:
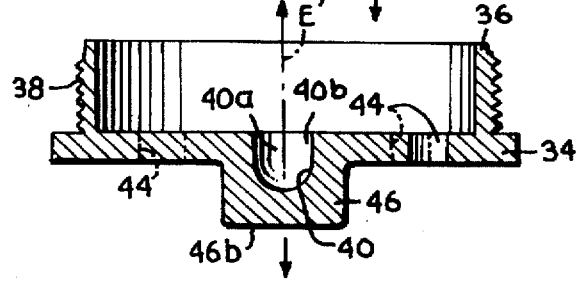
FIG. 9 is a vertical sectional view taken in direction of the arrows and along the plane of line 9—9 in FIG. 4.
Figure 12:
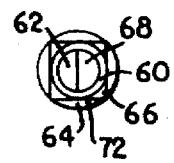
FIG. 12 is a top plan of a switching shaft assembly of the switching assembly of the voltage switching apparatus of FIG. 1.

The base assembly, as shown in FIG. 9, comprises a generally plate-like, generally circular bottom 34, having a generally perimetrical, annular wall member 36 generally concentrically aligned with and secured to one thereof, which wall 36 comprises previously mentioned complementary base threads, identified as 38, for engaging the body threads 26 of the body assembly 14. Like the body assembly 14, the base assembly 12 may be formed of any suitable, non-conductive and/or insulating material such as the commercially available material sold under the trade name Bakelite® by the Union Carbide Corporation. The base assembly 12 comprises an concave, dome-shaped recess 40 which is coaxially aligned with axis E' of the base assembly 12, for supporting one end of the previously mentioned shaft 60 of the switching assembly 16. As shown in FIG. 9, the dome-shaped recess 40 is formed in a bottom 46B of an annular or cylindrical support wall 46 which defines lumen or bore 40B having bottom 46B secured thereto. The lumen or bore 40, is coaxial with axis E' and with an aperture 40A formed in bottom 34. The aforementioned shaft 60 will pass through aperture 40A, into lumen or bore 40B to have a complementarily, dome-shaped end 70 of the shaft 60 (see also FIG. 5) become rotatably supported in the dome-shaped recess 40.

Thus it can be seen that the axes E and E' of the respective body assembly 14 and the base assembly 12 are coaxial or collinear when in an assembled state (i.e., the base threads 38 are mated with the body threads 26 so as to couple the base assembly 12 to the body assembly 14), and that the shaft 60 of the switching assembly is rotatably retained by the apertures 28A and 28B of the body assembly 14 and the dome-shaped recess 40, the bore 40B and the aperture 40A of the base assembly 12. As will be further discussed in the proceeding, any lateral movement of the shaft 60 of the switching assembly 16 parallel to the axes E and E' is generally prevented by the structure of the shaft 60 (i.e., the shaft 60 is held in place so as to be coaxial with the axes E and E' by the apertures 28A, 28B, 40A, and bore 40B).

The base assembly 12 further comprises a plurality of apertures 44 disposed in the bottom 34 for receiving a corresponding plurality of terminal members 42. The terminal members 42 and the corresponding apertures 44 are arranged in the bottom 34 of the base assembly 12 such that the terminal members 42 will contact the switching disc assembly 56 in a prescribed fashion, as will be further discussed as this description proceeds.

Figure 5:
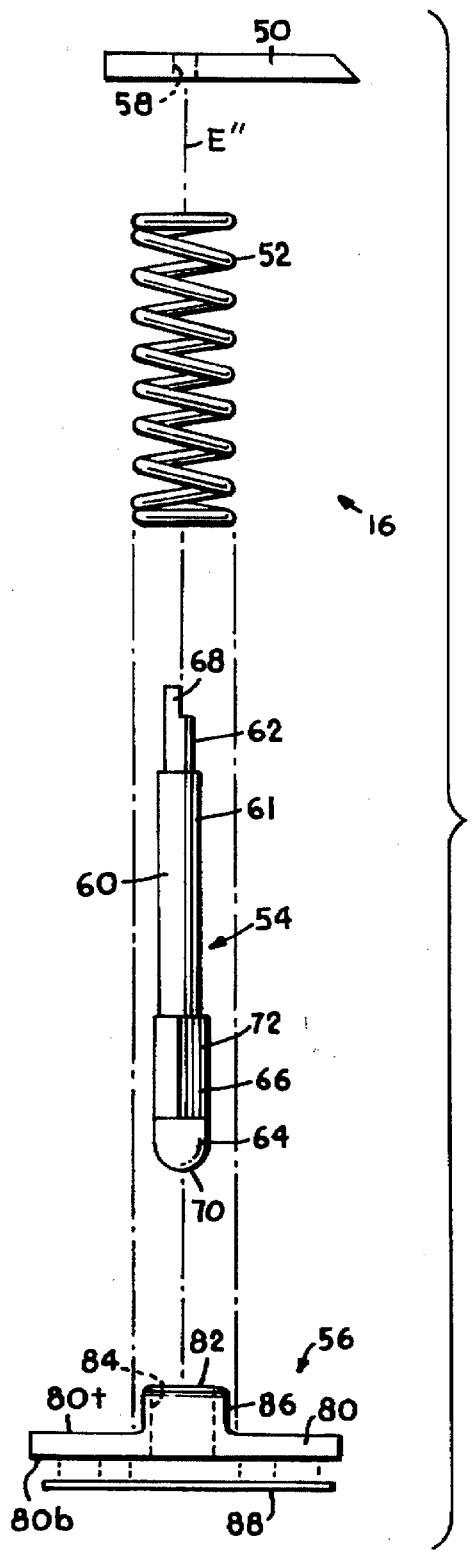
FIG. 5 is a segmented view of a switching assembly of the voltage switching apparatus of the present invention.
Figure 6:
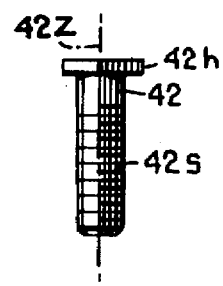
FIG. 6 is a side elevational view of a terminal of the switching apparatus of the present invention.
Figure 7:
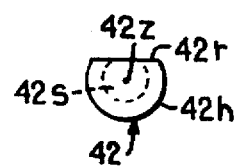
FIG. 7 is a top plan view of the terminal of FIG. 6.

The terminal members 42 may comprise any structure suitable for contacting the switching disc assembly 56 (see FIG. 5), as such devices are well known. In one embodiment, as best shown in FIGS. 6 and 7, the terminal members 42 may be defined by a bolt, wherein a head 42H comprises contacting surface for electrically engaging the switching disc assembly 56 (see also FIG. 1) and a threaded shaft 42S (see FIG. 6) for securing to the bottom 34 (see FIG. 9) and for engaging wire terminators or ends as may be used to connect the switching apparatus 10 to external wiring. It may be desired to form a flat section 42F, as shown in FIG. 7, in the head 42H of the terminal 42 to allow the terminal 42 be installed adjacent or proximal to the perimetrical wall 36 of the base 12 (see FIG. 9), as it desirable to maximize the size of the head 42H to increase the area of contact with the switching disc assembly 56 while maintaining a suitable distance among the plurality of terminals (e.g., to prevent arcing across the terminals). Such a flat section 42F may or may not be employed without limiting the spirit and scope of the invention. Each terminal member 42 comprises a terminal axis 42Z which is generally perpendicular to the bottom 34 of the base 12 when the respective terminal 42 is installed in the bottom 34 (see FIG. 9).

Figure 4:
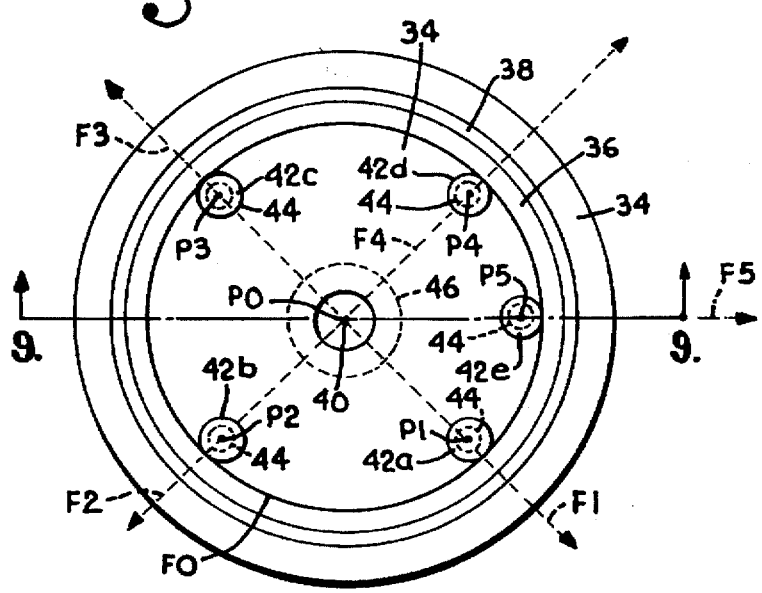
FIG. 4 is a bottom plan view of the voltage switching apparatus of FIG. 2 disclosing a plurality of terminals.

Generally, as best shown in FIG. 4, five terminal members 42 are disposed in corresponding five terminal apertures 44, with four of the terminal members 42 and the corresponding terminal apertures 44 arranged so as to be generally radially and perimetrically equispaced and adjacent to the inner edge of the perimetrical wall 36, with the fifth terminal 42/terminal aperture 44 perimetrically equispaced between two of the terminal members 42/terminal apertures 44. More specifically, as shown in FIG. 4, terminal members 42A, 42B, 42, and 42D are spaced so as to have the axes 42Z thereof aligned on quadrant boundaries, as represented in FIG. 4 by respective dashed rays F1, F2, F3, and F4, of a circle F0 defined by the intersection of bottom 34 and the perimetrical wall 36, with the origins of the rays F1, F2, F3, and F4 on a center P0 of circle F0. The fifth terminal member 42E is aligned on dashed ray F5, which ray bisects the quadrant defined by rays P1 and F4 into generally equal sectors or halves. Thus, the four terminals 42A, 42B, 42C, and 42D are generally spaced about 90 degrees apart and the fifth terminal 42E is generally equispaced between the first and fourth terminals 42A/42D so as to be about 45 degrees from both first and fourth terminals 42A/42D. As further shown in FIG. 4, the distance of the terminal members 42A, 42B, 42C, 42D, and 42E (and the respective terminal apertures 44) from the center P0 of circle F0 (i.e., the center of the bottom 34) is defined by the distance between center P0 and respective points P1, P2, P3, P4, and P5, wherein points P1, P2, P3, P4, and P5 represent the intersection of the axes 42Z of the respective terminals 42A, 42B, 42C, 42D, and 42E with the corresponding rays F1, F2, F3, F4, and F5. The distances defined between center P0 and the respective points P1, P2, P3, P4 and P5 are generally equivalent, and are slightly less than the radius of circle F0.

The switching assembly 16 as previously mentioned is rotatably supported by the combination of the base 12 and the body 14. To this end, the switching assembly 16 is comprised of a generally cylindrical shaft 60, as shown in FIG. 5, which is defined by a shaft top end 62 for protruding through apertures 28A and 28B of the body 14 (see also FIG. 8), a keyed shaft section 66 for demountably coupling to a switching disc assembly 56 (to be further discussed in the proceeding), and a shaft bottom end 64 for engaging and being supported by the base 12.

The shaft top end 62 comprises a flat, cut-out section 68, which, as shown in FIG. 1, is generally D-shaped in horizontal cross section for engaging a complementary D-shaped aperture 50A in a handle member 50 adapted to being demountably, fixedly coupled therewith. The shaft top end 62 is diametrically sized so as to pass through apertures 28A and 28B of the body 14 and so as to be firmly supported therein. It may be appreciated that the shaft top end 62 may be diametrically sized so as to frictionally engage the apertures 28A and 28B, however the shaft top end 62 is sized so as to permit rotation therein. This shaft top end 62 diameter, as shown in FIG. 5, is typically somewhat less than the diameter of the shaft assembly 60. As shown in FIGS. 5 and 8, the shaft section 62 is diametrically sized so as to pass through apertures 28A and 28B whereas a shaft section 61 of the shaft assembly 54 will not. The handle member 50 is provided for grasping by an operator to apply rotational force to the shaft assembly 54 to cause same to turn and effect switching of the switching apparatus 10 by correspondingly moving the switching disc assembly 56 across the plurality of terminals 42 in the base 12.

The shaft keyed section 66 comprises at least one flat side 72 for engaging a corresponding flat side 84 in an aperture 82 in the switching disc assembly 56 in order to demountably, fixedly couple the switching disc assembly 56 to the keyed section 66 of the shaft assembly 54 (i.e., such that the switching disc assembly 56 is correspondingly rotated with the switching shaft assembly 54 when the switching shaft assembly 54 is rotated). It is appreciated that any suitable keyed structure may be employed for demountably, fixedly coupling the keyed aperture 82 of the switching disc assembly 56 to the keyed section 66 of the shaft, such as that shown in FIGS. 1, 1A and 11, wherein the keyed section 66 of the shaft assembly 54 comprises four flat sides 72 for engaging the corresponding four flat sides 84 of the keyed aperture 82 of the switching disc assembly 56 shown in FIGS. 1, 1A and 10. It is equally understood that the keyed aperture 82 and the keyed section 66 could comprise six flat sides 84 and 72 respectively, or one keyed side 84 and 72 respectively, as in the case of the flat cut-out side 68 of the top shaft end 62 and the generally D-shaped keyed aperture 52 of the lever member 50.

The bottom shaft end 64 of the switching shaft assembly 54 comprises a generally rounded, convex or dome shaped end 70 which is sized for complementarily engaging and being supported by the dome shaped recess 40 of the base assembly 12. It can be seen in FIG. 1 that the dome shaped end 70 of the shaft assembly 54 provides a bearing surface for support of the shaft assembly 54 in and by the base 12 of the switching apparatus 10, and it may be appreciated that any suitable supporting surface (e.g., bearings, bushings or the like) may be employed without departing from the spirit and/or scope of the present invention. As further shown in FIG. 1, a tension spring member 52 may be disposed around the switching shaft assembly 54. The spring member 52 is sized so as to fit slightly loosely around the largest portion of the switching shaft assembly 54 (e.g., the keyed section 66) to provide spring bias on the switching disc assembly 56 for biasing the same against the terminal members 42 and ensuring positive contact between the relative terminals 42 and the switching disc assembly 56. The other end of the spring member 52 abuts shaft support structure 32 and/or top 22.

The aforementioned disc assembly 56 is shown in FIGS. 1, 10, 13, 13A, and 14–18. As best shown in FIG. 1, the switching disc assembly 56 comprises generally circular, generally flat supporting disc 80 having a coaxial, keyed aperture 82 aligned on a center C of the supporting disc 80 for engaging the previously mentioned flat sides 72 of keyed section 66 of the switching shaft assembly 54. A primary connection plate 88 and a secondary connection plate 90, each for electrically engaging and/or communicating with selected terminals 42, are secured to a bottom 80B of the supporting disc 80, by any suitable means, such as fasteners, adhesives, formed lips and recesses, or the like. The supporting disc may additionally comprise a stress relief section or supporting wall 86 which is formed and/or secured to a top 80T of the supporting disc 80 and aligned with and/or concentrically located with the aperture 82 for providing additional support to the keyed aperture 82, as best shown in FIG. 5. It is understood that the stress relief section 86 may or may not be employed without departing from the spirit and/or scope of the present invention. The supporting disc 80 is formed or manufactured from any suitable material which is typically non-electrically conductive, such as the commercially available material sold under the trade name Bakelite® by the Union Carbide Corporation.

Figure 10:
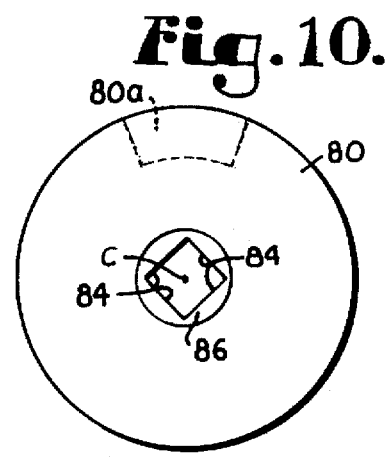
FIG. 10 is a top plan view of the supporting disc of the switching assembly of the present invention having a keyed center aperture and a terminal cut-out aperture.
Figure 11:
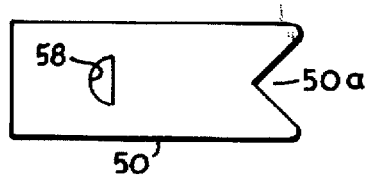
FIG. 11 is a top plan view of a handle member of the switching apparatus of FIG. 1.

The supporting disc 80 may additionally comprise a cut-out section 80A, as shown in FIG. 10, formed in the perimeter of the supporting disc 80 for aligning with a similar cut-out section (to be identified as 100 and described herebelow) in the primary connection plate 88. The cut-out section 80A of the supporting disc 80 may or may not be employed without departing from the spirit and/or scope of the present invention.

Figure 13:
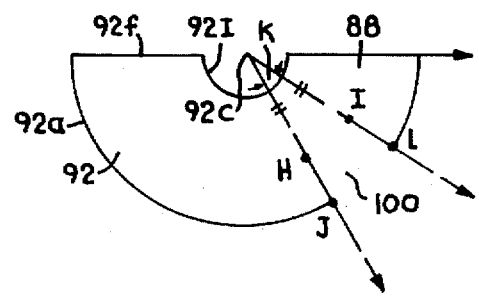
FIG. 13 is a top plan view of a primary connection plate member of the switching disc assembly of the present invention.

The primary connection plate 88, as shown in FIGS. 13 and 13A, is adapted to being secured or formed in the supporting disc 80 and electrically interconnecting up to three of the terminal members 42, (i.e., the primary connection plate 88 alternatively interconnects terminals 42A, 42B and 42C or 42E and 42B based on the selected operation of the switching apparatus 10 as will be further discussed below) as shown in FIGS. 15–18. The primary connection plate 88 is formed of any suitable material which is capable of conducting electricity, such as copper, aluminum, etc. The primary connection plate 88 may comprise any suitable shape which will switch the terminal member 42 in the manner to be set forth below, such as shown in FIG. 13 The primary connection plate 88, as shown in FIG. 13, is a flat plate member which is defined by a generally semi-annular shape 92, having an outer arcuate edge 92A, an inner arcuate edge 92I (i.e., relative to the annular shape 92), a flat edge 92F, and a center 92C (i.e., of the circle defined by the semi-annular shape), which center 92C is generally shared or copunctual with the center C of the supporting disc 80 (also see FIG. 1) The primary connection plate 88 comprises a cut-out section 100 formed in the outer arcuate edge 92A for preventing electrical interconnection with terminal 42A (see FIGS. 16 and 18), when the switching assembly 16 of the switching apparatus 10 is set in a particular fashion to be further discussed herebelow. The cut-out section 100 is sized so as to prevent the terminal 42A from physically and/or electrically making contacting when the primary connection plate 88 of the switching apparatus 10 is made to be oriented as shown in FIG. 1A.

As shown in FIG. 13, the cut-out section 100 in the primary connection plate 88 may be generally defined by the intersection of angle K originating at 92C with arcuate edge 92A at points J and L, the arc defined by points H and I on angle K, and the line segments HJ and IL, such that the distance of points H I from the apex of angle K is generally equivalent. Cut-out 100 is defined by lines HJ, IL, and arc MI. Angle K has one side KL thereof measuring about 30 degrees from the side 92S of flat edge 92F, and the other side KJ thereof measuring about 60 degrees from side 92S. It will be appreciated that the exact geometric form and size of the cutout 100 is determined by the particular size of the head 42H (see FIG. 7) of the terminal 42A (see FIG. 16) employed since the cut-out 100, as previously indicated, exists precisely to prevent interconnection with terminal 42A (see FIGS. 16 and 18) as will be further discussed herebelow; thus the exact nature of the cut-out section bed (i.e., size, shape, etc) should not be construed so as to limit the spirit and/or scope of the present invention. The size of the cut-out section 100 serves to prevent electrical interconnection with terminal 42A and may for example, comprise a generally arcuate or generally semi-circular shape. Such a semi-circular shape generally has a center (i.e., of the circle defining the semi-circular shape) aligned on the point B' intersecting the perimeter of F0 (see FIG. 1A) and an angle B commencing from side 92S which angle B measures about 45 degrees. Of course, as already mentioned, cut-out 100 may comprise any suitable shape.

It will be appreciated that the inner edge 92I of the primary connection plate 88 is sized so as to allow room for the switching shaft assembly 54 to pass therethrough and/or to abut the stress relief 86 should such stress relief 86 additionally be desired on bottom 80B and/or otherwise so as accommodate the keyed aperture 82 (e.g., in the case stress relief 86 is not employed). In any case, the center 92C of the primary connection plate 88 is generally shared or copunctual with (or comprises) the center C of the supporting disc 80.

The switching disc assembly 56 comprises the aforementioned secondary connection plate 90 which is adapted to interconnecting up to two terminal members 42 (i.e., the secondary connection plate 90 will alternately interconnect or disconnect terminals 42E and 42D) as shown in FIGS. 15–18. As in the case of the primary connection plate 88, the secondary connection plate 90 is formed of any suitable material for making electrical connections, such as by way of example only, copper, aluminum, or the like. The secondary connection plate 90 may comprise any suitable shape which will selectively interconnect/disconnect the terminal members 42 in the manner to be set forth below, such as those shown in the FIGS. 14 and 14A.

Figure 14:
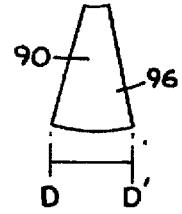
FIG. 14 is a top plan view of a secondary connection plate member of the switching disc assembly of the present invention.
Figure 14A:
FIG. 14A is a top plan view of an alternate embodiment of the secondary connection plate member.
Figure 15:
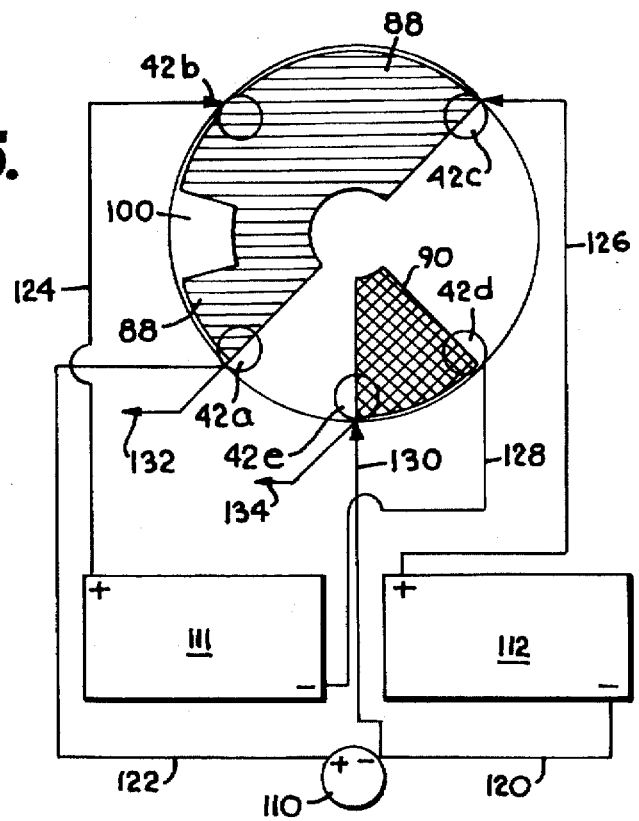
FIG. 15 is a schematic diagram of the switching assembly of the present invention disclosing a pair of battery members in communication with the switching assembly in a low voltage jump position.
Figure 16:
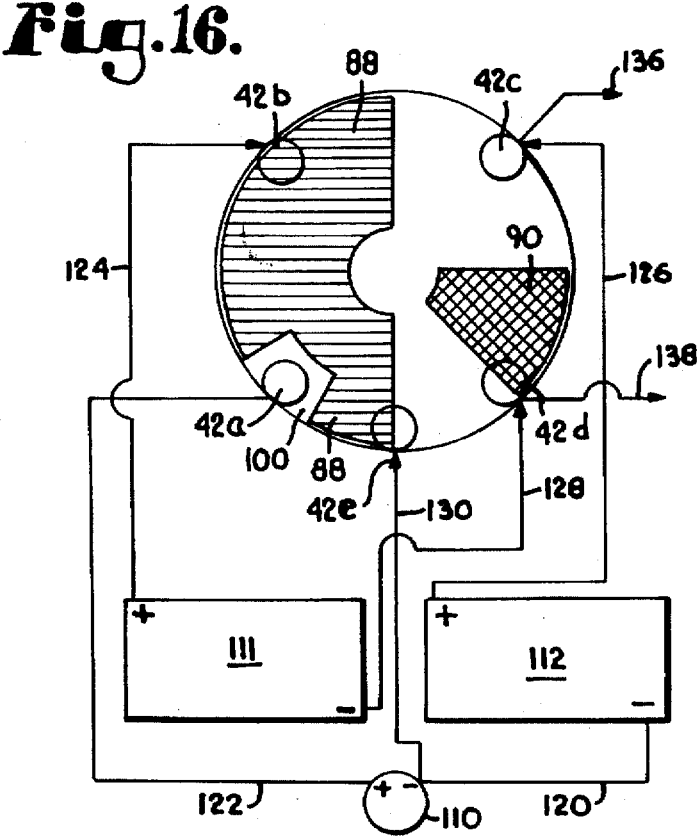
FIG. 16 is a schematic diagram of the switching assembly of the present invention disclosing a pair of battery members in communication with the switching assembly in a high voltage jump position.
Figure 17:
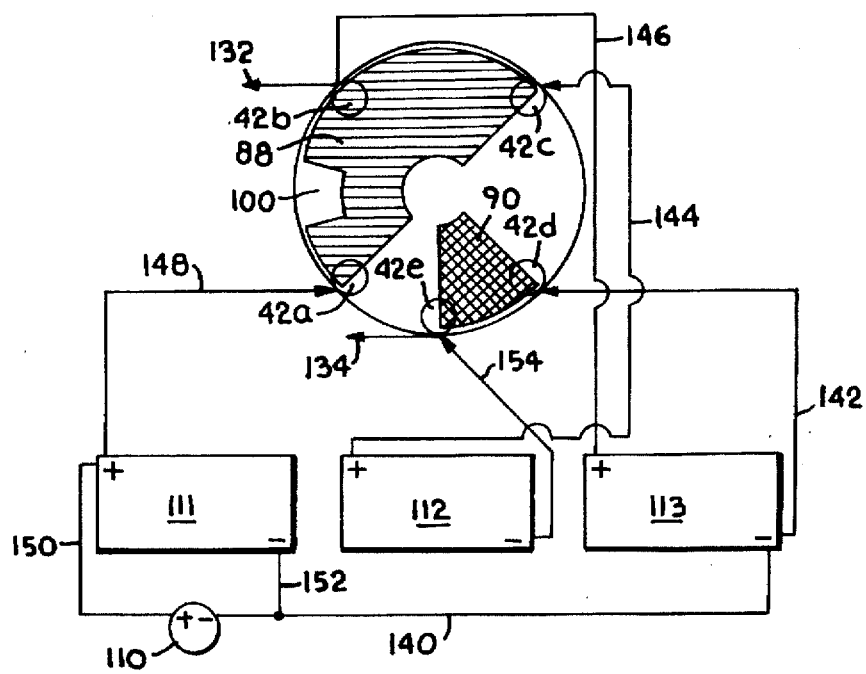
FIG. 17 is a schematic diagram of the switching assembly of the present invention disclosing three battery members in communication with the switching assembly in a low voltage jump position.
Figure 18:
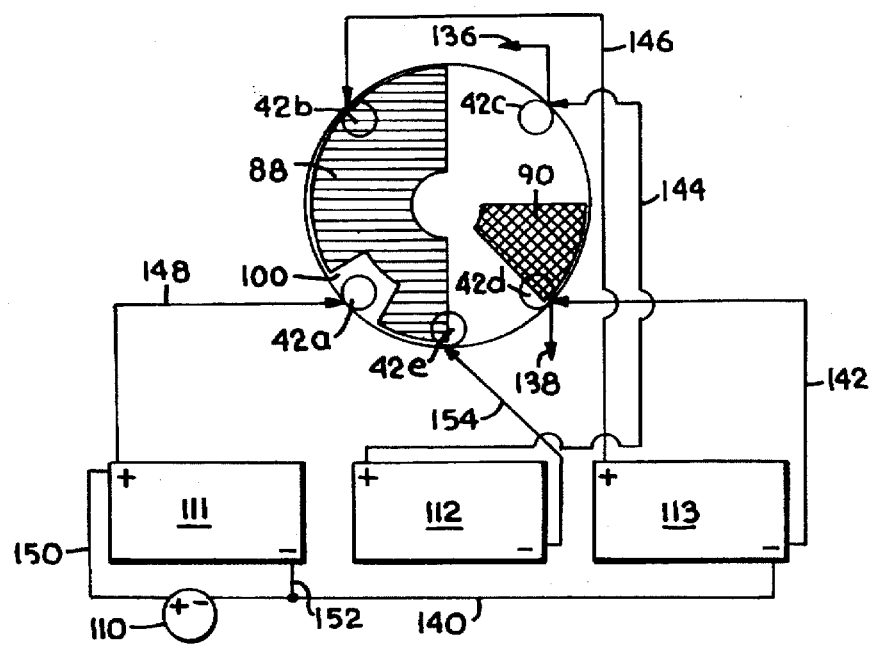
FIG. 18 is a schematic diagram of the switching assembly of the present invention disclosing three battery members in communication with the switching assembly in a high voltage jump position.

As shown in FIG. 14, the secondary connection plate 90 comprises a generally pie shaped, flat plate member 96. More specifically, generally hie shaped plate member 96 is defined by about a 45 degree sector of an annulus having a center 96O (which center 96C aligns with the center C of the supporting disc 80), an outer arcuate edge 96A and an inner arcuate edge 96I. In the embodiment of FIG. 14A, the secondary connection plate 90 is defined by a flat plate member 98 which is generally rectangular or trapezoidal. In each of the embodiments shown in FIG. 14 and 14A, the secondary connection plate 90 comprises a width denoted by line segment DD', which width (i.e., as delimited by DD' in FIGS. 14 and 14A) is sufficient to interconnect the terminals 42D and 42E, as shown in FIGS. 15 and 17, but not sufficient to interconnect terminals 42C and 42D, as shown in FIGS. 16 and 18. A brief inspection of FIGS. 15–18 reveals that the width defined by DD' is slightly less than the radius as taken from the center C of the supporting disc 80 to its perimeter (i.e. the length of DD' is approximately ¼πr). The secondary connection plate 90 is secured to the supporting disc 80 in a manner to facilitate electrical connection of terminals 42D and 42E as shown in FIGS. 15 and 17 and further discussed below.

The switching disc assembly 56 (see FIG. 1A) thus assembled with the primary connection plate 88 and the secondary connection plate 90 secured thereto by any suitable means, such as fastening members, adhesives, or the like, share their respective centers C, 92C, and 96C (i.e., the centers C, 92C, and 96C are coaxial or copunctual). The primary connection plate 88 and the secondary connection plate share a fixed spatial relationship on supporting disc 80. This relationship is represented by angle A wherein the angular distance between a flat side 92S of the primary connection plate 88 and a flat side 96S of secondary connection plate 90, as measured by angle A originating from the center C, is about 45 degrees, +/− about 5 degrees. The secondary connection plate 90 is accordingly adapted to electrically interconnecting terminals 42D and 42E, which as previously indicated, are about 45 degrees apart relative to the center of the circle defined by the supporting disc 80 and the perimetrical wall 36. Similarly, the primary connection plate 88, having an angular measure of about 180 degrees, is adapted to interconnecting terminals 42A, 42B, and 42C while the secondary connection plate interconnects terminals 42D and 42E, as shown in FIGS. 15 and 17.

Continuing to refer to the drawings for operation and use of the switching apparatus 10 of the present invention, the switching apparatus 10 as assembled (see FIG. 1) has the base 12 engaged to the body 14 by any suitable means such as the respective complementary threads 38 and 26. The shaft assembly 54 is generally vertically supported by the base 12 and the body 14 with the dome shaped end 70 of the shaft assembly 54 supported in the corresponding dome shaped recess 40 of the base 12 such that the D-shaped end 68 of the shaft assembly 54 protrudes through aperture 28 of the body 14. The axes E,E', and E" of the respective body 14, base 12, and shaft assembly 54 are all generally colinear. The switching disc assembly 56 is engaged to the shaft assembly 54 such that keyed aperture 82 is coupled with the keyed section 66 of the shaft assembly 54 so as to be coaxial therewith and is co-rotatable upon rotation of the shaft assembly 54. Tension spring member 52 is disposed around the shaft assembly 54 so as to bias the switching disc assembly 56 against the base 12. The spring 52 in this manner has one end engaged to the inside face of top 22 of the body 14 and the other end engaged to the top 80T of the switching disc assembly 56. It can be seen that the spring 52 ensures positive contact of the primary and secondary connection plates 88 and 90 secured to the bottom 80B of the switching disc assembly 56 with the terminals 42 of the base 12. The handle member 50 has D-shaped aperture 58 engaged to the corresponding D-shaped end 62 of the shaft assembly 54 for effecting rotation of the shaft assembly 54 and the switching disc assembly 56 therewith.

As best shown in FIGS. 15–18, the switching apparatus 10 is contemplated for use with either two or three battery members, identified in FIGS. 15–16 as 111 and 112, and in FIGS. 17–18 as 111, 112, 113 for operating in either a low voltage or high voltage setting. The low voltage setting corresponds to the lowest voltage of the batteries employed as wired in parallel to a common output whereas the high voltage setting typically corresponds to twice the low voltage setting. For example, if 12 volt batteries are employed (e.g. automotive batteries), the low voltage setting of the switching apparatus 10 will provide about 12 volts at the output terminals and the high voltage setting will provide about 24 volts at the output terminals. As will be seen, the switching apparatus 10 operates to switch the bank of batteries provided between either series or parallel connections.

FIGS. 15 and 16 schematically illustrate the low voltage and high voltage wiring arrangement as used with two batteries 111 and 112, and FIGS. 17–18 illustrated the low voltage and high voltage wiring arrangements as used with three batteries 111–112–113. It is appreciated that typically the switching apparatus 10 will be used in conjunction with an automobile of some kind as used for jump starting and as such one of the batteries (e.g., battery 111) may be employed with the vehicle's own charging system. When the batteries 111–112 are connected by the switching apparatus 10 in the parallel, low voltage position, as shown in FIG. 15, both batteries 111–112 are typically maintained by the vehicle's charging system. Similarly, when the batteries 111–112–113 are connected by the switching apparatus 10 in the parallel, low voltage position, as shown in FIG. 17, all batteries 111–112–113 are typically maintained by the vehicle's charging system. Of course, the switching apparatus 10 may be used independently of a vehicle where necessary; such use of the voltage switching apparatus 10 independent of or in conjunction with a vehicle should not be construed so as to limit the spirit and/or scope of the present invention. Additionally, FIGS. 15–18 illustrate a starter 10 of a vehicle's charging system. It is appreciated that the starter 110 is not necessary for proper operation of the switching apparatus 10, but is shown since the most common use of the switching apparatus 10 contemplates use in conjunction with a vehicle that is used to provide current to other vehicles with possess either a 12 volt or 24 volt electrical system. It is further appreciated that the switching apparatus 10 may be used with two or three of any voltage supply (e.g., batteries, power generators, etc) which are capable of being wired in series and parallel.

The schematics shown in FIGS. 15 and 16 represent the interconnection effected by the switching apparatus 10 when used with two batteries 111–112 in the low voltage position shown in FIG. 15 (e.g., 12 volts when used with car batteries) and the high voltage position in FIGS. 16 (e.g., 24 volts when used with car batteries). As shown in FIGS. 15 and 16, the starter 110 has its negative terminal interconnected with battery 112 by line 120 and interconnected with terminal 42E by line 130 thereby commonly connecting terminal 42E, the negative side of starter 110, and the negative side of battery 112. Line 122 interconnects the positive side of the starter 110 with terminal 42A, and line 124 connects the positive side of battery 111 with terminal 42B. Line connects the positive side of battery 112 with terminal 42C, and line 128 connects the negative side of battery 111 with terminal 42D. Cables for drawing low voltage, such as may be used to interconnect the batteries 111–112 (or other voltage power supply, as previously indicated) to the vehicle or device requiring the power, are represented as 132 and 134 in FIG. 15. Terminal 42A provides positive voltage for cable 132 and terminal 42E provides negative voltage for cable 134. The cables for drawing high voltage are represented as 136 and 138, for connecting respectively to the high positive side and the high negative side of the switching apparatus 10 at terminals 42C and 42D respectively The schematics shown in FIGS. 17 and 18 represent the interconnection of the switching apparatus 10 when used with three batteries 111–112–113. The low voltage position is shown in FIG. 17 and the high voltage position is shown in FIG. 18. Line 40 interconnects the negative side of the starter 110 with battery 113 and line 142. Line 142 also interconnects the negative side of battery 113 and line 140 with terminal 42D to place the negative side of the starter 110, the negative side of the battery 113, and terminal 42D in common communication. The positive side of battery 113 is interconnected with terminal 42B by line 146, the positive side of battery 112 is interconnected with terminal 42C by line 144, and the positive side of battery 111 is interconnected with terminal 42A by line 148. Another line 150 interconnects line 148 and/or battery 111 with the positive side of the starter 110, and line 152 interconnects the negative side of battery 111 with the line 140 and/or the negative side of the starter 110. The cables 132–134 for drawing low voltage interconnect terminals 42B and 42E respectively (see FIG. 17), and the cables 136–138 for drawing high voltage interconnect terminals 42C and 42D respectively (see FIG. 18). It is appreciated that any suitable location for connecting the cables 132–134 (FIGS. 15 and 17) and/or 136–138 (FIGS. 16 and 18) may be used without departing from the spirit and/or scope of the present invention. Further, for the schematics shown in FIGS. 17 and 18, it will be appreciated that battery 111 and starter 110 are interconnected together in a parallel fashion to the extent that one is omittable (i.e., either the battery 111 or the starter 110 may be disconnected) without affecting the operation of the switching apparatus 10. Thus, the three battery arrangement of FIGS. 17 and 18 is similar to the two battery arrangement of FIGS. 15 and 16 with the third battery (i.e., battery 111 in FIGS. 17 and 18 is wired in parallel with the starter 110) and the starter 110 being interchangeable in that the battery 111 and the starter 110 of FIGS. 17 and 18 are both comprised of a vehicle's charging system. For example, a third battery member may be wired in parallel with the starter 110 (i.e., of a vehicle's charging system) shown in FIGS. 15 and 16 for a three battery arrangement similar to that shown in FIGS. 17 and 18.

As shown in FIGS. 15 and 17, when the voltage switching apparatus 10 is in the low voltage setting, the primary connection plate 88 interconnects terminals 42A, 42B, and 42C, and the secondary connection plate 90 interconnects terminals 42D and 42E. For the two battery arrangement shown in FIG. 15, the low voltage setting effects a parallel coupling of the batteries 111–112, along with the starter 110 to provide output voltage to the cables 132 and 134. As can be seen in FIG. 15, the secondary connection plate 90 electrically connects lines 130 and 128 and/or 120, which has the effect of coupling the negative sides of batteries 111 and 112 together, along with the negative side of the starter 110. Likewise, in the low voltage setting, the primary connection plate 90 effects electrical connection of the lines 122, 124, and 126, which are respectively connected to the terminals 42A, 42B, and 42C, to connect the positive sides of the batteries 111–112 along with the positive side of the starter 110. As shown in FIG. 17, the primary connection plate 90 effects connection of the positive sides of batteries 111–112–113 through respective lines 148, 144, and 146, along with the positive side of the starter 110 through line 150, while secondary connection plate 90 electrically connects the negative sides of the batteries 112–113 through lines 154 and 142 respectively. The negative sides of battery 111 and starter 110 interconnect line 142 via line 140 and are thus interconnected with the negative sides of batteries 112 and 113.

When the voltage switching apparatus 10 is in the high voltage setting as shown in FIGS. 16 and 18, the primary connection plate 88 interconnects terminals 42B and 42E while the secondary connection plate does not interconnect any of the terminals, although the secondary connection plate remains in contact with terminal 42D. For the two battery arrangement in FIG. 16, the high voltage setting provides a series coupling the batteries 111–112, with the starter 110 (e.g., the charging system of a vehicles) being electrically discommunicated from the batteries 111–112. As it can be seen in FIG. 16, the positive side of the starter 110 is connected with terminal 42A by line 122, and when the primary connection plate is in the high voltage setting, cutout 100 in the primary connection plate 88 is situated above terminal 42A specifically to prevent electrical communication between terminal 42A and the starter 110 through line 122. Likewise, in the high voltage setting for the three battery arrangement in FIG. 18, the primary connection plate 88 interconnects terminals 42B and 42E while the secondary connection plate 90 does not interconnect any terminals, although the secondary plate 90 remains in contact with terminal 42D. When the voltage switching apparatus 10 is in the high voltage setting, the cut-out 100 is situated above terminal 42A to prevent electrical communication between terminal 42A and the primary connection plate 88, as in the case of the two battery arrangement shown in FIG. 16. As shown in FIG. 18, the batteries 112 and 113 are connected in series while battery 111 and starter 110 are electrically discommunicated from batteries 112 and 113.

It may be apparent from examination of the FIGS. 1 and 15–18 that the switching apparatus 10 operates by selectively interconnecting terminals 42A, 42B, 42C, 42D, and 42E in two possible configurations. As previously mentioned, the first configuration electrically interconnects terminals 42A, 42B, and 42C while simultaneously electrically interconnecting terminals 42D and 42E, as shown in FIGS. 15 and 17 and the second configuration electrically interconnects terminals 42E and 42B only, as shown in FIGS. 16 and 18. The selection of the voltage setting is effected, as may be evident, by rotating the shaft assembly 54 to cause the switching disc assembly 56 to correspondingly rotate and engage the primary connection plate 88 and the secondary connection plate 90 supported by the supporting disc 80 with the terminal members 42A, 42B, 42C, 42D, and 42E, in the fashion described above. The switching disc assembly 56 is rotated by about 45 degrees to effect disconnection from parallel connection of the batteries 111–112 and subsequent connection in series of the batteries 111–112. The converse is also true; the switching shaft assembly 56 is rotated by about 45 degrees in the opposite direction to disconnect the series arrangement of the batteries 111–112 and subsequently reconnect them (i.e., the batteries 111–112) in parallel. This approximate 45 degree rotation of the switching disc assembly 56 is effected by correspondingly rotating the handle member 50 and/or the switching shaft assembly 54 by the same amount (i.e., about 45 degrees). It is appreciated that the top (see FIG. 1) may additionally comprise a pair of stop members 22L—22L wherebetween the handle member 50 is delimited for preventing the rotation of the shaft assembly 54 and the switching disc assembly 56 coupled therewith outside of the area shown in FIGS. 15 and 16; more specifically, to prevent the secondary connection plate 90 from engaging terminals 42A, 42B, 42C, and/or 42D and/or to prevent the primary connection plate from engaging terminal 42D, the handle member 50 has an arc of motion G delimited by the stop members 22L—22L as shown in FIG. 1. The arc of motion G, as defined above is about 45 degrees. It is understood that any suitable means for preventing rotation of the switching disc assembly 56 outside of the requisite boundaries as set forth above (i.e., about 45 degrees) is included in the spirit and scope of the present invention, such as a semi-sector cut out in the supporting disc 80 which defines an arc of permissible rotation of the switching disc assembly 56 and a stop lug formed in the base 12 for engaging the edges defined by the semi-sector cut out.

As previously indicated, the switching apparatus 10 is provided for switching between two voltages of the attached batteries 111–112 (see FIG. 15) or any other suitable power supply. Typically, the switching apparatus 10 is used in conjunction with a 12 volt vehicle to provide a 24 volt jump start current to heavy equipment having a 24 volt electrical system which requires a jump start. Usually cables are secured to the terminals 42A, 42B, 42C, 42D, and 42E as shown in FIGS. 15–18 by any suitable means, such as with wire terminators and nuts. In the case it is necessary to jump start a 24 volt vehicle, the switching apparatus 10 is provided for being attached to the two batteries 111–112, which will typically comprise 12 volt auto batteries (or the three batteries 111–112–113, as shown in FIGS. 17 and 18) but not the jump starting vehicle's starter 110 (i.e., the vehicle's charging system), for providing 24 volt output at cables 136 and 138 (see FIG. 16) by connecting the batteries 111–112 in series through the switching apparatus 10. More specifically, terminal 42B connects the positive side of battery 111 with terminal 42E, which connects to the negative side of battery 112. Cable 136 takes positive voltage from battery 112 through terminal 42C, and cable 138 takes negative voltage from battery 111 through terminal 42D. Alternatively, where a 12 volt jump start voltage is required, the switching apparatus 10 is set as shown in FIG. 15 such that terminals 42A, 42B, and 42C are all interconnected so as to connect the positive sides of the starter 110, battery 111, and battery 112 respectively connected therewith together in parallel. Likewise, terminals 42D and 42E connect the negative sides of the batteries 111 and 112 together in parallel. Cables 132 and 134 are taken from terminals 42A and 42E respectively for connecting to the vehicle to be jump started.

While the present invention has been described herein with reference to a particular embodiment thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A switching apparatus for selecting one of a first D.C. voltage supply and a second D.C. voltage supply wherein the second D.C. voltage supply voltage is generally twice the value of the first D.C. voltage supply's voltage comprising:

(a) a housing assembly; said housing assembly comprising a generally circular wall member having a top member perimetrically secured to a top edge thereof and (b) a base member threadably secured to a bottom edge thereof; said top member comprising a shaft aperture disposed therein generally coaxially aligned with said circular wall member; said base member defining a bottom; a generally dome-shaped recess disposed in said bottom so as to be coaxially and concentrically aligned with said circular wall member and said shaft aperture;

(c) a plurality of terminal members disposed in said bottom of said base so as to be generally equally, radially spaced from said generally dome-shaped recess; said plurality of terminals comprising a first terminal, a second terminal, a third terminal, a fourth terminal, and a fifth terminal; said first terminal, said second terminal, said third terminal, and said fourth terminal being generally equispaced so as to comprise an arcuate measure of between 85 and 95 degrees between said first terminal, said second terminal, said third terminal, and said fourth terminal; said fifth terminal being equispaced between said first terminal and said fourth terminal so as to comprise an arcuate measure of between 40 and 50 degrees between said first terminal and said fifth terminal;

(d) a switching assembly; said switching assembly comprising a generally cylindrical shaft member having a top shaft end, a bottom shaft end, and a keyed shaft section; said shaft top end defining a general D-shape in horizontal cross section; said bottom shaft end comprising a convex dome shape for complementing said generally dome shaped recess of said base member; said keyed shaft section of said generally cylindrically shaped shaft defining at least one flat, keyed surface therein;

(e) a non-conductive supporting disc member having a support top face, a support bottom face, and a coaxially disposed keyed aperture; said coaxially disposed keyed aperture defining a shape which is complementary to said keyed shaft section of said generally cylindrical shaft member; said supporting disc member being fixedly coupled to said keyed shaft section of said generally cylindrically shaped shaft member so as to be coaxially aligned therewith;

(f) a primary connection plate member secured to said support bottom of said non-conductive supporting disc member for electrically connecting at least two of said plurality of terminals;

(g) a secondary connection plate member secured to said support bottom of said non-conductive supporting disc member for electrically connecting with at least one of said plurality of terminals; and (h) a handle member for rotatably moving said generally cylindrical shaft member and said non-conductive supporting disc member coupled therewith; said handle member comprising a generally D-shaped aperture for engaging said D-shaped shaft top end.

2. The apparatus of claim 1 wherein said primary connection plate comprises a generally semi-circular, annular, flat plate member defining a circular center, having an outer cut-out section disposed in an arcuate perimeter thereof.

3. The apparatus of claim 2 wherein said supporting disc member is springably biased against said plurality of terminals with a spring member.

4. The apparatus of claim 3 wherein said top additionally comprises a pair of stop members for engaging said handle member and preventing same from full 360 degree rotation; said stop members defining an arc of motion of said handle member; said arc of motion measuring about 45 degrees.

5. A method for alternatively connecting at least two batteries in series or in parallel comprising:

(a) providing a first battery member having a first voltage;

(b) providing a second battery member having a second voltage;

(c) providing a switching apparatus for connecting said first battery with said second battery comprising a housing having five terminal members disposed therein and for rotatably supporting a switching assembly comprising a supporting disc having a primary connection plate adapted for alternatively interconnecting at least two of said five terminals and a secondary connection plate for alternatively interconnecting at least one of said terminals;

(d) connecting a first positive terminal of said first battery to a second terminal of said five terminals;

(e) connecting a second positive terminal of said second battery to a third terminal of said five terminals;

(f) connecting a first negative terminal of said first battery to a forth terminal of said five terminals;

(g) connecting a second negative terminal of said second battery to a fifth terminal of said five terminals;

(h) rotating said supporting disc so as to interconnect said second terminal and said third terminal with said primary connection plate to interconnect said first positive terminal with said second positive terminal;

(i) simultaneously interconnecting said forth terminal and said fifth terminal with said secondary connection plate to interconnect said first negative terminal with said second negative terminal to connect said first battery with said second battery in parallel;

(j) commencing reverse rotation said supporting disc so at to disconnect said third terminal from said primary connection plate;

(k) simultaneously with said commencing step (j) disconnecting said secondary connection plate from said fifth terminal; and (l) further rotating said supporting disc so as to interconnect said fifth terminal and said second terminal with said primary connection plate to connect said first positive terminal with said second negative terminal to connect said first battery with said second battery in series.

6. The method of claim 5 wherein an arc of motion defined by said reverse rotation step (j) and said further rotating step (l) is about 45 degrees.

7. A switching apparatus for alternatively switching between a parallel connection and a serial connection of at least D.C. voltage power supplies comprising:

(a) a housing assembly; said housing assembly comprising a generally circular base member having first, second, third, and fourth terminal members disposed in a bottom of said base so as to be generally equally, radially spaced from a center of said base, and a fifth terminal; said fifth terminal being equispaced between said first terminal and said fourth terminal so as to comprise an arcuate measure of 45 degrees between said first terminal and said fifth terminal;

(b) a springably biased switching assembly for electrically engaging said first, second, third, fourth, and fifth terminals; said switching assembly comprising a generally cylindrical shaft member defining a keyed shaft section; said cylindrical shaft member being rotatably supported by said housing assembly; said keyed shaft section defining at least one flat, keyed surface therein; a nonconductive supporting disc member having a support top face, a support bottom face, and a coaxially disposed keyed aperture for complementary engaging said keyed shaft section; said supporting disc member being fixedly coupled to said keyed shaft section so as to be coaxially aligned therewith; (c) a primary connection plate member secured to said support bottom of said non-conductive supporting disc member for alternatively electrically connecting said first, second, and third terminals or said second and fifth terminals; said primary connection plate defining a generally semi-annular shape having an arcuate perimeter; said arcuate perimeter comprising a cut-out for alternatively aligning with said first terminal member to alternatively prevent electrical connection of said primary connection plate with said first terminal; a secondary connection plate member secured to said support bottom of said nonconductive supporting disc member for alternatively electrically connecting said fourth and fifth terminals or said fourth terminal.

8. The switching apparatus of claim 7 wherein said shaft member of said switching assembly additionally comprises a shaft top end defining a general D-shape in horizontal cross section for engaging a handle member and a shaft bottom end defining a general dome shape for a shaft support recess; a shaft support recess disposed in said generally circular base member coaxially aligned therewith for supporting said shaft member; said shaft support recess comprising a generally concave dome-shape for complementarily receiving said dome-shaped bottom end of said shaft member; a handle member having a generally D-shaped aperture for complementarily receiving said D-shaped top end of said shaft member; and said handle member having said D-shaped aperture thereof engaged with said D-shaped top end of said shaft member.

9. The switching apparatus of claim 7 wherein said housing assembly additionally comprises a body assembly formed of a generally circular wall member having a threaded bottom edge thereof for engaging a base assembly and a top member secured to said circular wall member; said top comprising a shaft aperture for rotatably supporting said cylindrical shaft member coaxially aligned with said circular wall member; said housing assembly further comprising a base assembly formed of a generally flat, circular bottom having a threaded perimetrical wall bound thereto; said threaded perimetrical wall comprising a size sufficient to complementarily threadably engage said threaded bottom edge of said body assembly; a shaft support recess disposed in said bottom for supporting said shaft member coaxially aligned with said bottom; and said shaft support recess and said shaft aperture being coaxially aligned.

10. The switching apparatus of claim 9 wherein said shaft member of said switching assembly additionally comprises a shaft top end defining a general D-shape in horizontal cross section for engaging a handle member and a shaft bottom end defining a general dome shape for engaging said shaft support recess; said shaft support recess comprising a generally concave dome-shape for complementing said shaft bottom end; a handle member having a generally D-shaped aperture for complementarily receiving said D-shaped top end of said shaft member; and said handle member having said D-shaped aperture thereof engaged with said D-shaped top end of said shaft member.

11. The switching apparatus of claim 8 additionally comprising a pair of stop members secured to said top of said housing for restricting an arc of motion of said handle member.

12. The switching apparatus of claim 10 additionally comprising a pair of stop members secured to said top of said housing for restricting an arc of motion of said handle member.

13. The switching apparatus of claim 11 wherein said first, second, third, fourth, and fifth terminal members each comprise a bolt member defining a terminal head and a terminal shaft; said terminal head being adapted for electrically communicating with said primary connection plate and said secondary connection plate; said terminal shaft being adapted for electrically communicating with and be secured to an electrical cable.

14. The switching apparatus of claim 12 wherein said first, second, third, fourth, and fifth terminal members each comprise a bolt member defining a terminal head and a terminal shaft; said terminal head being adapted for electrically communicating with said primary connection plate and said secondary connection plate; said terminal shaft being adapted for electrically communicating with and be secured to an electrical cable.

* * * * *